(12) United States Patent
Sakai et al.

(10) Patent No.: US 7,010,296 B2
(45) Date of Patent: Mar. 7, 2006

(54) METHOD OF REGISTERING SERVICES IN MOBILE-COMMUNICATION SYSTEM

(75) Inventors: Kenichiro Sakai, Kawasaki (JP); Hiroshi Takubo, Hiroshima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/357,353

(22) Filed: Jul. 14, 1999

(65) Prior Publication Data
US 2002/0177438 A1    Nov. 28, 2002

(30) Foreign Application Priority Data
Oct. 13, 1998   (JP) ................................. 10-290188

(51) Int. Cl.
    *H04Q 7/20*    (2006.01)
(52) U.S. Cl. ................. 455/432.1; 455/435.2
(58) Field of Classification Search ................ 455/432, 455/435, 414, 426, 432.1, 435.3, 432.2, 433, 455/434, 435.1, 435.2, 551, 414.4, 552.1
    See application file for complete search history.

(56) References Cited

U.S. PATENT DOCUMENTS

| 5,553,130 | A | * | 9/1996 | Turner ...................... 379/220 |
| 5,915,214 | A | * | 6/1999 | Reece et al. ............... 455/406 |
| 5,999,811 | A | * | 12/1999 | Molne ....................... 455/432 |
| 6,064,887 | A | * | 5/2000 | Kallioniemi et al. ........ 455/445 |
| 6,094,578 | A | * | 7/2000 | Purcell et al. .............. 455/426 |
| 6,097,950 | A | * | 8/2000 | Bertacchi ................... 455/432 |
| 6,112,087 | A | * | 8/2000 | Tayloe ....................... 455/435 |
| 6,148,197 | A | * | 11/2000 | Bridges ...................... 455/432 |
| 6,263,201 | B1 | * | 7/2001 | Hashimoto et al. ......... 455/403 |
| 6,389,278 | B1 | * | 5/2002 | Singh ......................... 455/414 |
| 6,453,162 | B1 | * | 9/2002 | Gentry ....................... 455/433 |

FOREIGN PATENT DOCUMENTS

| JP | 53-135202 | 11/1978 |
| JP | 62-64192 | 3/1987 |
| JP | 1-303818 | 12/1989 |
| JP | 4-35559 | 2/1992 |
| JP | 9-9355 | 1/1997 |

* cited by examiner

*Primary Examiner*—Melody Mehrpour
(74) *Attorney, Agent, or Firm*—Katten Muchin Rosenman LLP (57) ABSTRACT

A method of registering a service whereby a mobile-communication terminal of a given communication-service provider roaming in a network of a foreign communication-service provider registers a service includes the steps of sending a provider identifier of the foreign communication-service provider from the network to the mobile-communication terminal, storing the provider identifier in the mobile-communication terminal, providing a service-code-correspondence table in the mobile-communication terminal, the table showing correspondences of service codes between a plurality of communication-service providers including the given communication-service provider and the foreign communication-service provider, identifying a service code of the foreign communication-service provider corresponding to a service code of the given communication-service provider by referring to the table and the provider identifier when the service code of the given communication-service provider is entered in the mobile-communication terminal, and sending the service code of the foreign communication-service provider from the mobile-communication terminal to the network.

9 Claims, 11 Drawing Sheets

| SERVICE | PROVIDER A | PROVIDER B | PROVIDER C | ... |
|---|---|---|---|---|
| CALL TRANSFER:START | 1421 | 112 | #21 | |
| CALL TRANSFER:CANCEL | 1420 | 114 | #22 | |
| VOICE MAIL:START | 1411 | 116 | #31 | |
| VOICE MAIL:CANCEL | 1410 | 118 | #32 | |
| ... | | | | |
| ... | | | | |

METHOD OF REGISTERING SERVICES IN MOBILE-COMMUNICATION SYSTEM

BACKGROUND OF THE INVENTION

1. Field of the Invention

The present invention relates to a method of registering service used when a mobile-communication terminal capable of roaming from an associated communication-service provider to another communication-service provider registers services in a network of the latter communication-service provider.

2. Description of the Related Art

In recent years, mobile communication has become widely available as a plurality of communication-service providers offer services over various areas. Since all the communication-service providers do not cover all the areas, some mobile-communication terminals are equipped with a function to roam from one communication-service network to another communication-service network for the purpose of receiving a continuous service between different service areas.

Each communication-service provider renders various services to subscribers of motile-communication terminals. Some of these services require fees, and others do not. In many cases, communication-service providers require communication-service terminals to register use of or cancellation of a specific service before a requested service takes effect. There are various services such as a call-transfer service, a voice-mail service, etc. A code used for requesting service registration, however, is not unified among the communication-service providers. Since each communication-service provider tends to use a different code for this purpose, a complex procedure is required when a communication-service terminal needs to register services as the terminal moves from a network area of an associated communication-service provider to a new network area of another communication-service provider.

Figure 10:
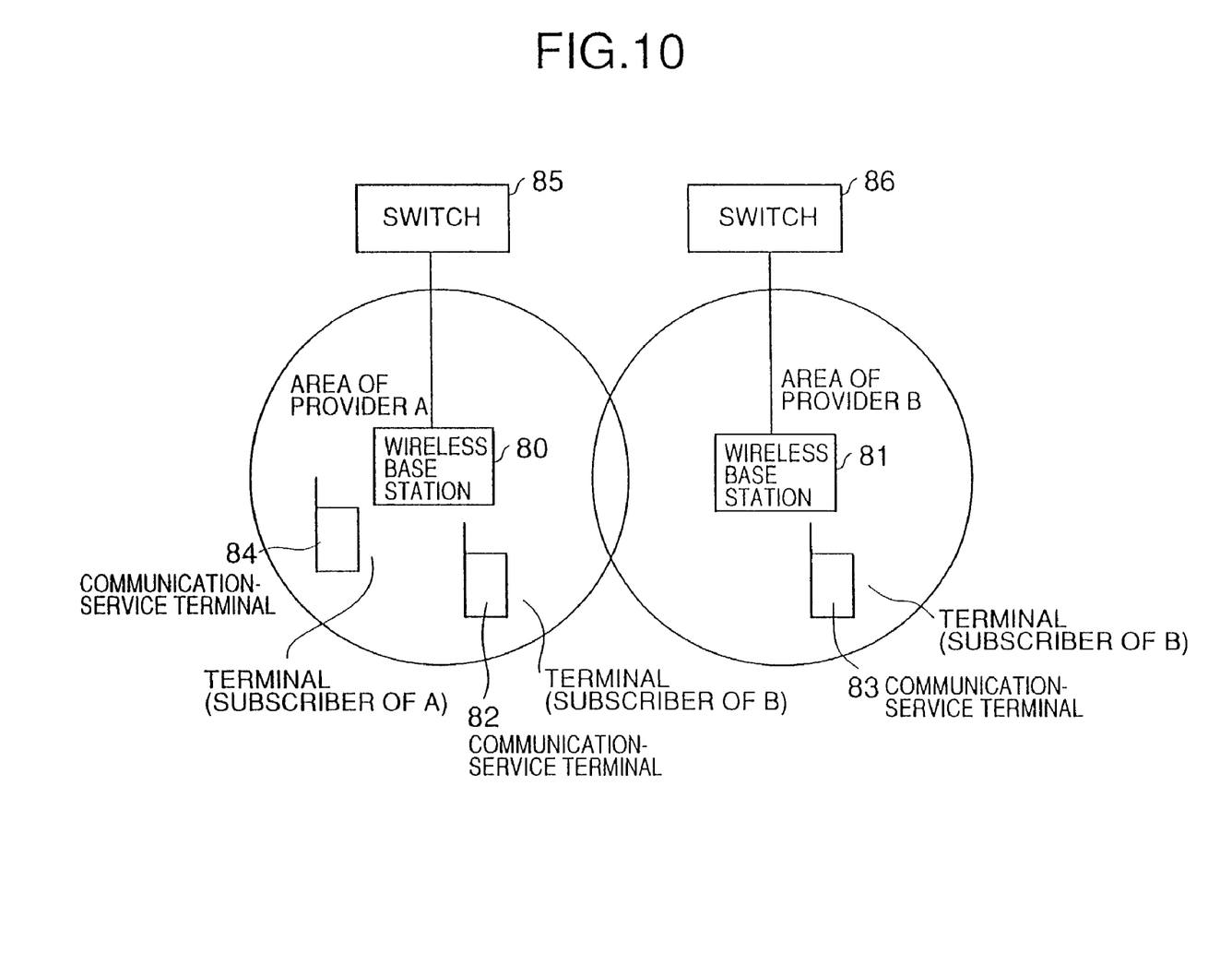
FIG. 10 is an illustrative drawing for explaining positional relations between communication-service-provider areas and communication-service terminals.

FIG. 10 is an illustrative drawing for explaining positional relations between communication-service-provider areas and communication-service terminals.

In FIG. 10, a wireless base station 80 belongs to a communication-service provider A, and a wireless base station 81 belongs to a communication-service provider B. A communication-service terminal 82 is a subscriber of the communication-service provider B, and is currently positioned in an area covered by the communication-service provider A. A communication-service terminal 83 is a subscriber of the communication-service provider B, and is located in an area of the communication-service provider B. Further, a communication-service terminal 84 belongs to the communication-service provider A, and is situated in the area of the communication-service provider A. A switch 85 is provided for the wireless base station 80, and is a facility of the communication-service provider A. A switch 86 is provided for the wireless base station 81, and is a facility of the communication-service provider B.

In the mobile-communication system as shown in FIG. 10, the communication-service terminals 83 and 84 are allowed to roam between the two communication-service-provider networks. When the communication-service terminal 84 currently positioned in the area of the communication-service provider A (area of the wireless base station 80) needs to register use or cancellation of services such as a call-transfer service, a voice-mail service, and a call-waiting service, the communication-service terminal 84 dials a code (number) that is specified by the communication-service provider A. In detail, for example, a code "1421" is dialed when requesting registration for adding a call-transfer service, and a code "1420" is dialed when requesting registration for canceling a call-transfer service. When the wireless base station 80 receives a code, the switch 85 analyzes the code so as to identify a request. Then, subscriber data of the communication-service terminal 84 is registered to add or cancel a call-transfer service.

By the same token, when the communication-service terminal 83 currently positioned in the area of the communication-service provider B (area of the wireless base station 81) needs to register use or cancellation of a call-transfer service, the communication-service terminal 83 dials a code (number) that is specified by the communication-service provider B. For example, a code "112" is used for adding a call-transfer service, and a code "114" is used for canceling a call-transfer service. When the wireless base station 81 receives these codes, the switch 86 analyzes the codes to identify the requests, and, then, subscriber data is registered accordingly.

In the following, a description will be provided with regard to a case in which the communication-service terminal 82 requests registration for use of services by using service codes that are defined by a communication-service provider B.

Figure 11:
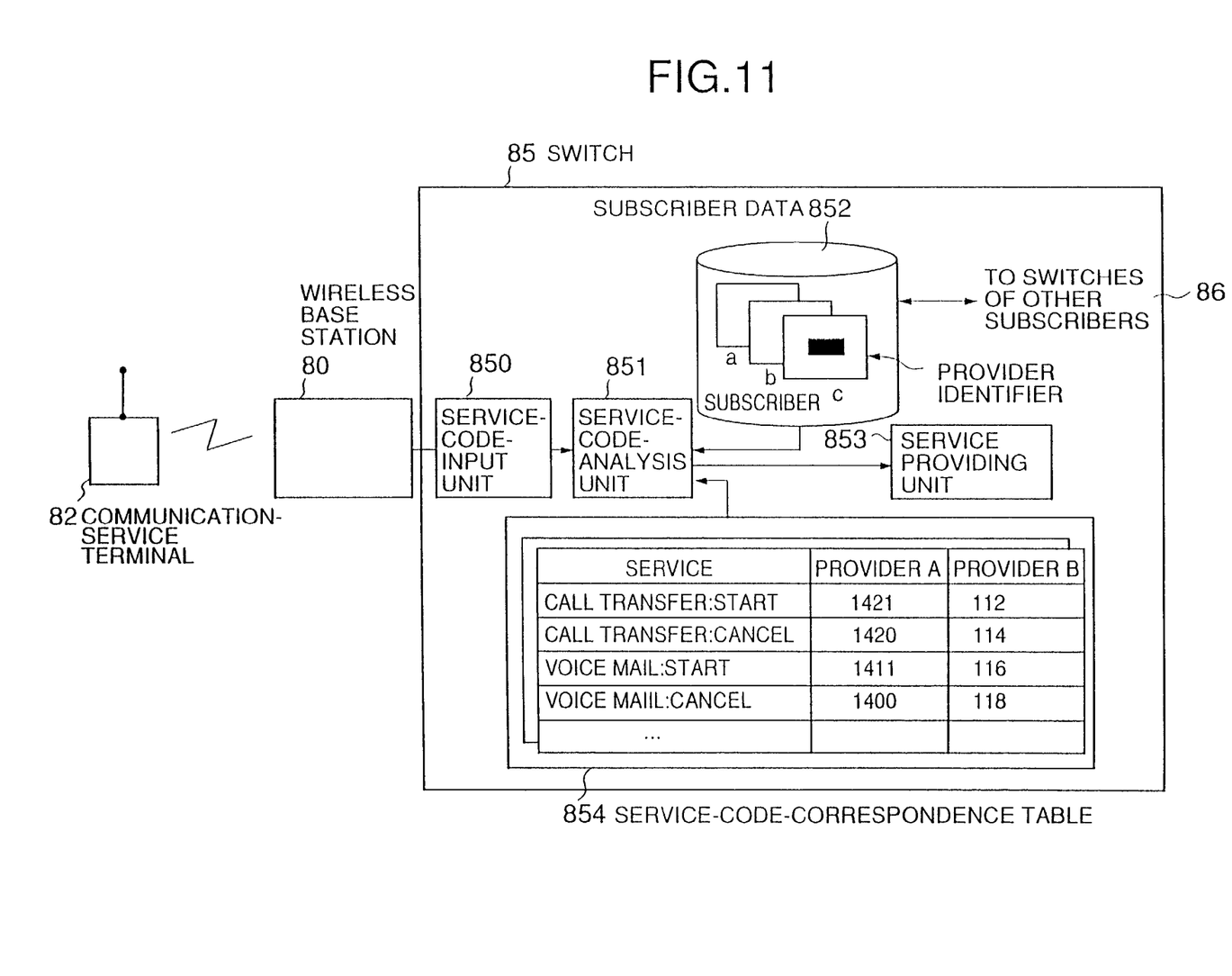
FIG. 11 is a block diagram of a switch of the related art.

FIG. 11 is a block diagram of the switch 85. In FIG. 11, the same elements as those of FIG. 10 are referred to by the same numerals, and a description thereof will be omitted.

The switch 85 includes a service-code-input unit 850, a service-code-analysis unit 851, subscriber data 852, a service providing unit 853, and a service-code-correspondence table 854. The service-code-input unit 850 receives a service code sent from the wireless base station 80. The service-code-analysis unit 851 analyzes the received service code. The service providing unit 853 renders a service that is requested by the communication-service terminal 82. The service-code-correspondence table 854 stores all the codes used by the communication-service providers, and makes it possible to match one code with another where the communication-service providers use different service codes.

The communication-service terminal 82, which is roaming in the area of the communication-service provider A, needs to register use of a call-transfer service. In this case, the communication-service terminal 82 transmits a signal carrying the code "112" that is defined by the communication-service provider B, and this signal is input to the service-code-input unit 850 of the switch 85 via the wireless base station 80. Then, the service-code-analysis unit 851 determines which communication-service provider is used by the communication-service terminal 82 based on a terminal number that is received from the communication-service terminal 82 along with the service code.

As the terminal number reveals that the communication-service terminal 82 belongs to the communication-service provider B, the received service code is searched for among codes of the communication-service provider B in the service-code-correspondence table 854. As a result, the received service code is identified as a code for adding a call-transfer service.

The received service code of the communication-service provider B is then converted into a corresponding service code of the communication-service provider A, and registration is effected in the subscriber data 852. Further, the subscriber data and a description of the requested service (or service code of the communication-service provider B) are sent to the switch 86 (FIG. 10) that belongs to the communication-service provider B. The service providing unit 853 renders a service according to what is registered in the subscriber data 852.

In order to cope with a service-registration request received from a communication-service terminal that is residing in a foreign communication-service-provider network, a switch needs to be provided with all the service codes of all the communication-service providers which permit roaming. Further, the switch needs to convert the received service code after identifying the associated communication-service provider of the communication-service terminal. This requires a complex control procedure, resulting in a low efficiency of call processing control of the switch.

Accordingly, there is a need for a method of registering services which is based on a simple control procedure so as to achieve prompt processing when a communication-service terminal requests service registration in a foreign communication-service-provider network.

SUMMARY OF THE INVENTION

Accordingly, it is a general object of the present invention to provide a method of registering services which can satisfy the need described above.

It is another and more specific object of the present invention to provide a method of registering services which is based on a simple control procedure so as to achieve prompt processing when a communication-service terminal requests service registration in a foreign communication-service-provider network.

In order to achieve the above object, a method of registering a service whereby a mobile-communication terminal of a given communication-service provider roaming in a network of a foreign communication-service provider registers a service includes the steps of sending a provider identifier of the foreign communication-service provider from the network to the mobile-communication terminal, storing the provider identifier in the mobile-communication terminal, providing a service-code-correspondence table in the mobile-communication terminal, the table showing correspondences of service codes between a plurality of communication-service providers including the given communication-service provider and the foreign communication-service provider, identifying a service code of the foreign communication-service provider corresponding to a service code of the given communication-service provider by referring to the table and the provider identifier when the service code of the given communication-service provider is entered in the mobile-communication terminal, and sending the service code of the foreign communication-service provider from the mobile-communication terminal to the network.

In the method as described above, the provider identifier is given from the network to the mobile-communication terminal, so that the mobile-communication terminal can identify which communication-service provider covers an area where the mobile-communication terminal is currently positioned. Also, the mobile-communication terminal is provided with the service-code-correspondence table. This allows the mobile-communication terminal to identify a service code of the foreign communication-service provider corresponding to a service code of the given communication-service provider when the service code of the given communication-service provider is entered in the mobile-communication terminal. The mobile-communication terminal thus can send the service code of the foreign communication-service provider that covers an area where the mobile-communication terminal is currently located.

According to another aspect of the present invention, a method of registering a service whereby a mobile-communication terminal of a given communication-service provider roaming in a network of a foreign communication-service provider registers a service includes the steps of sending a correspondence table from the network to the mobile-communication terminal, the table showing correspondences between service codes of the foreign communication-service provider and service codes of a plurality of communication-service providers including the given communication-service provider, storing the table in the mobile-communication terminal, identifying a service code of the foreign communication-service provider corresponding to a service code of the given communication-service provider by referring to the table when the service code of the given communication-service provider is entered in the mobile-communication terminal, and sending the service code of the foreign communication-service provider from the mobile-communication terminal to the network.

In the method as described above, the table is sent from the network to the mobile-communication terminal, and the table is configured such that the mobile-communication terminal can identify service codes of the foreign communication-service provider that covers an area where the mobile-communication terminal is currently positioned. This allows the mobile-communication terminal to identify a service code of the foreign communication-service provider corresponding to a service code of the given communication-service provider when the service code of the given communication-service provider is entered in the mobile-communication terminal. The mobile-communication terminal thus can send the service code of the foreign communication-service provider that covers an area where the mobile-communication terminal is currently located.

According to another aspect of the present invention, a method of registering a service whereby a mobile-communication terminal of a given communication-service provider roaming in a network of a foreign communication-service provider registers a service includes the steps of sending a service code of the given communication-service provider and a provider identifier directly indicating the given communication-service provider from the mobile-communication terminal to a switch of the network when the service code of the given communication-service provider is entered in the mobile-communication terminal, and identifying, in the switch, a service code of the foreign communication-service provider corresponding to the service code of the given communication-service provider by referring to the provider identifier and a table which shows correspondences of service codes between a plurality of communication-service providers including the given communication-service provider and the foreign communication-service provider.

In the method described above, the provider identifier identifies the provider with which the mobile-communication terminal is associated as a subscriber, and the mobile-communication terminal sends the provider identifier to the switch of the network along with the service code of the given communication-service provider. This allows the switch to easily identify the service code of the foreign communication-service provider corresponding to the service code of the given communication-service provider since the provider identifier directly indicates the given communication-service provider among many other communication-service providers.

Other objects and further features of the present invention will be apparent from the following detailed description when read in conjunction with the accompanying drawings.

DESCRIPTION OF THE PREFERRED EMBODIMENTS

In the following, principles and embodiments of the present invention will be described with reference to the accompanying drawings.

Figure 1:
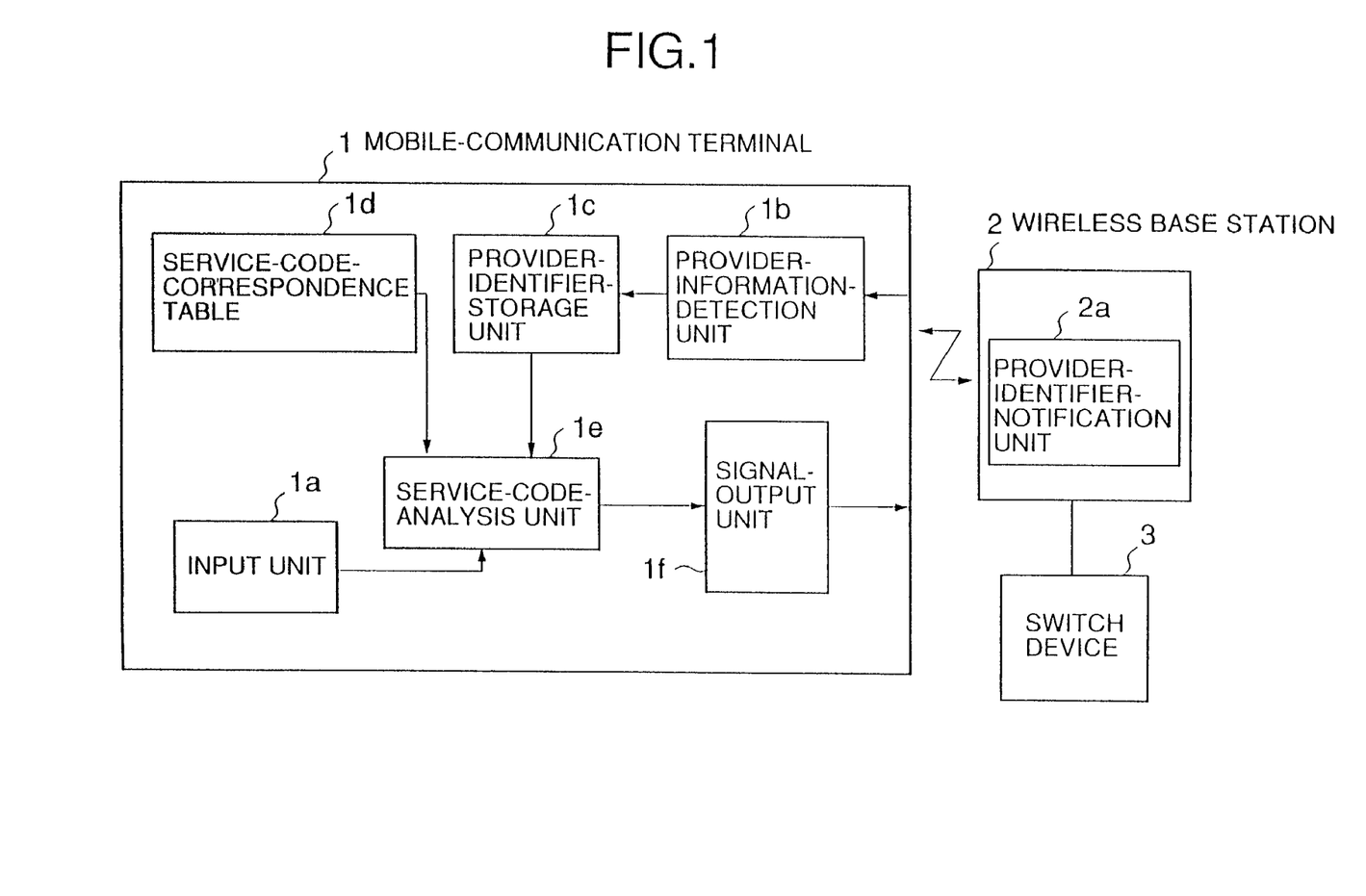
FIG. 1 is a block diagram showing a configuration of a system according to a first principle of the present invention.

FIG. 1 is a block diagram showing a configuration of a system according to a first principle of the present invention.

In FIG. 1, a mobile-communication terminal 1 includes an input unit 1a, a provider-information-detection unit 1b, a provider-identifier-storage unit 1c, a service-code-correspondence table 1d, a service-code-analysis unit 1e, and a signal-output unit 1f. The provider-information-detection unit 1b detects provider information including a provider identifier when relevant information is received from a base station. The provider-identifier-storage unit 1c stores a provider identifier. The service-code-correspondence table 1d stores service codes of communication-service providers by matching the service codes of the same service contents between different communication-service providers. The service-code-analysis unit 1e analyzes a received service code, and converts the received service code into a service code that is used by a communication-service provider of a currently positioned area where the mobile-communication terminal 1 is currently positioned. The signal-output unit 1f outputs a signal to a base station by using the service code of the communication-service provider of the currently positioned area. Further, a wireless base station 2, which is provided in the currently positioned area, includes a provider-identifier-notification unit 2a. The provider-identifier-notification unit 2a informs a mobile-communication terminal of a provider identifier, which indicates a communication-service provider that owns the wireless base station 2, when the mobile-communication terminal is posi- tioned in its area of control. Further, the wireless base station 2 is connected to the switch device 3.

In FIG. 1, the mobile-communication terminal 1 belongs to a communication-service provider that is different from the communication-service provider that owns the wireless base station 2. The provider-identifier-notification unit 2a of the wireless base station 2 transmits a provider identifier of the communication-service provider that owns the wireless base station 2 at constant intervals or within constant intervals. Each mobile-communication terminal residing in the area covered by the wireless base station 2 receives the provider identifier as a signal, and the provider-information-detection unit 1b of the mobile-communication terminal 1 obtains the provider information from the received signal. The provider-information-detection unit 1b stores the obtained provider identifier in the provider-identifier-storage unit 1c. A user of the mobile-communication terminal 1 requests registration of a particular service by entering a relevant service code, which is defined by the communication-service provider of the mobile-communication terminal 1. When the service code is entered, the input unit 1a detects the service code, and the service-code-analysis unit 1e analyzes the service code. Namely, the service-code-correspondence table 1d is referred to, and the detected service code is searched for among the service codes of the communication-service provider of the mobile-communication terminal 1. Based on the stored correspondences between different communication-service providers, a service code of the communication-service provider identified by the provider identifier stored in the provider-identifier-storage unit 1c is obtained. The obtained service code is transmitted from the signal-output unit if to the wireless base station 2. The switch device 3 analyzes this service code to attend to necessary processing.

Figure 2:
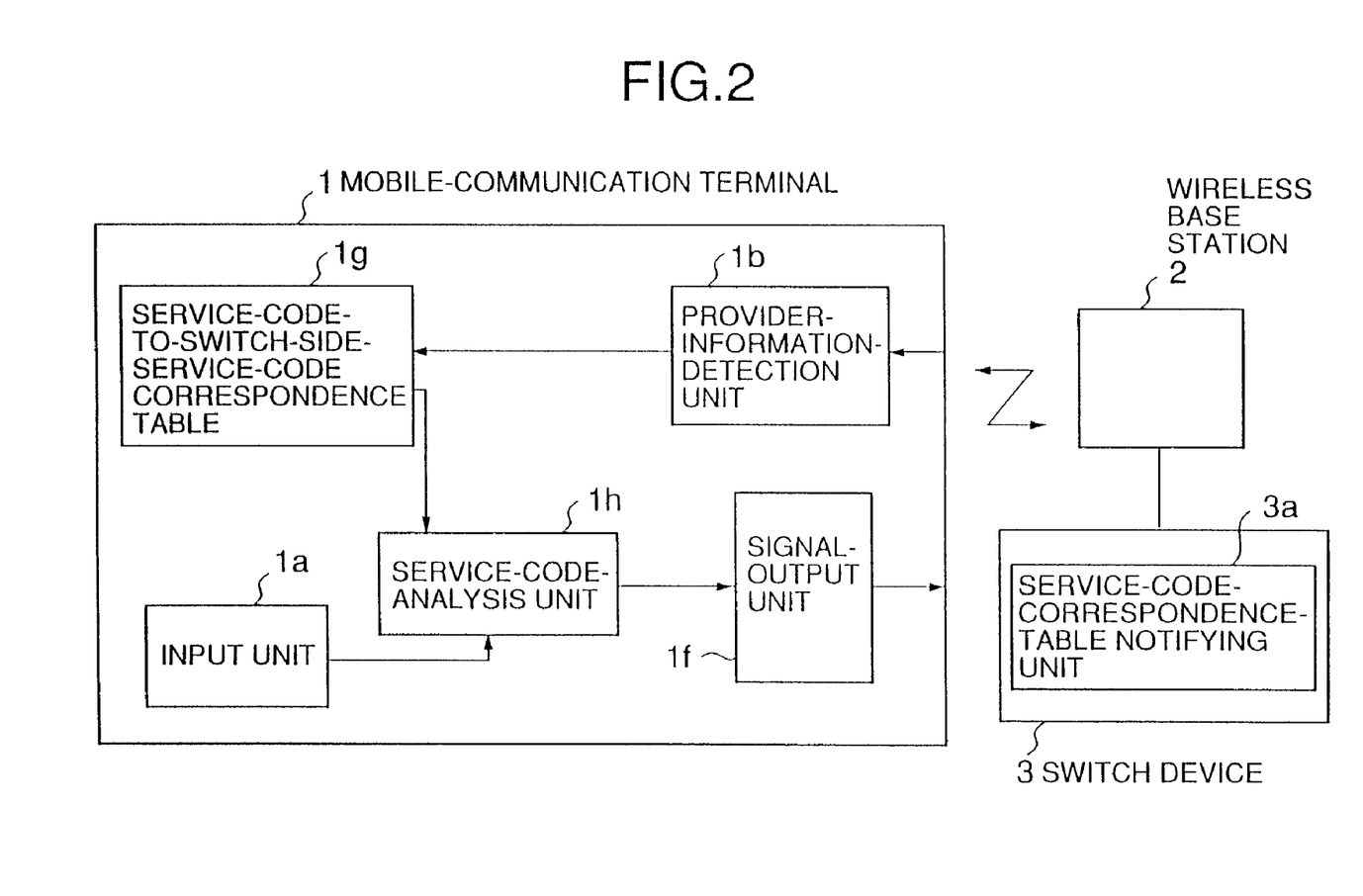
FIG. 2 is a block diagram showing a configuration of a system according to a second principle of the present invention.

FIG. 2 is a block diagram showing a configuration of a system according to a second principle of the present invention. In FIG. 2, the same elements as those of FIG. 1 are referred to by the same numerals.

The mobile-communication terminal 1 includes the input unit 1a, the provider-information-detection unit 1b, the signal-output unit if, a service-code-to-switch-side-service-code correspondence table 1g, and a service-code-analysis unit 1h. The service-code-to-switch-side-service-code correspondence table 1g is received from the switch device 3 via the wireless base station 2. The switch device 3 includes a service-code-correspondence-table notifying unit 3a for sending the service-code-to-switch-side-service-code correspondence table 1g. The service-code-to-switch-side-service-code correspondence table 1g stores service codes and switch-side service codes by keeping correspondences therebetween. Here, the stored service codes are those used by foreign communication-service providers for the purpose of requesting services, and the stored switch-side service codes are those defined by the communication-service provider that owns the wireless base station 2 and the switch device 3.

The mobile-communication terminal 1 belongs to a communication-service provider that is different from the communication-service provider that owns the wireless base station 2. When the service-code-correspondence-table notifying unit 3a of the switch device 3 transmits the service-code-to-switch-side-service-code correspondence table to the mobile-communication terminal 1, the provider-information-detection unit 1b of the mobile-communication terminal 1 obtains the table, and stores it as the service-code-to-switch-side-service-code correspondence table 1g. The service-code-to-switch-side-service-code correspondence table may be set in the wireless base station 2 by the switch device 3, and the wireless base station 2 may periodically transmit the table to the communication-service terminals residing in its area of control.

A user of the mobile-communication terminal 1 requests registration of a particular service by entering a relevant service code, which is defined by the communication-service provider of the mobile-communication terminal 1. When the service code is entered, the input unit 1a detects the service code, and the service-code-analysis unit 1h analyzes the service code. Namely, the service-code-analysis unit 1h refers to the service-code-to-switch-side-service-code correspondence table 1g, and searches for the detected service code to identify a corresponding switch-side service code. The identified switch-side service code is transmitted from the signal-output unit if to the switch device 3 via the wireless base station 2. The switch device 3 analyzes the switch-side service code to attend to requested processing.

As an alternative approach, the related-art configuration of FIG. 11 may be modified such that the communication-service terminal 82 sends a provider identifier and a service request to the switch 85 at the time of service registration. (In the related art, the provider identity was found by analyzing a terminal number.) Upon receiving the provider identifier and the service request, the switch 85 uses the service-code-analysis unit 851 to refer to the service-code-correspondence table 854, and finds a corresponding service code to attend to necessary processing.

In the following, embodiments of the present invention will be described.

Figure 3:
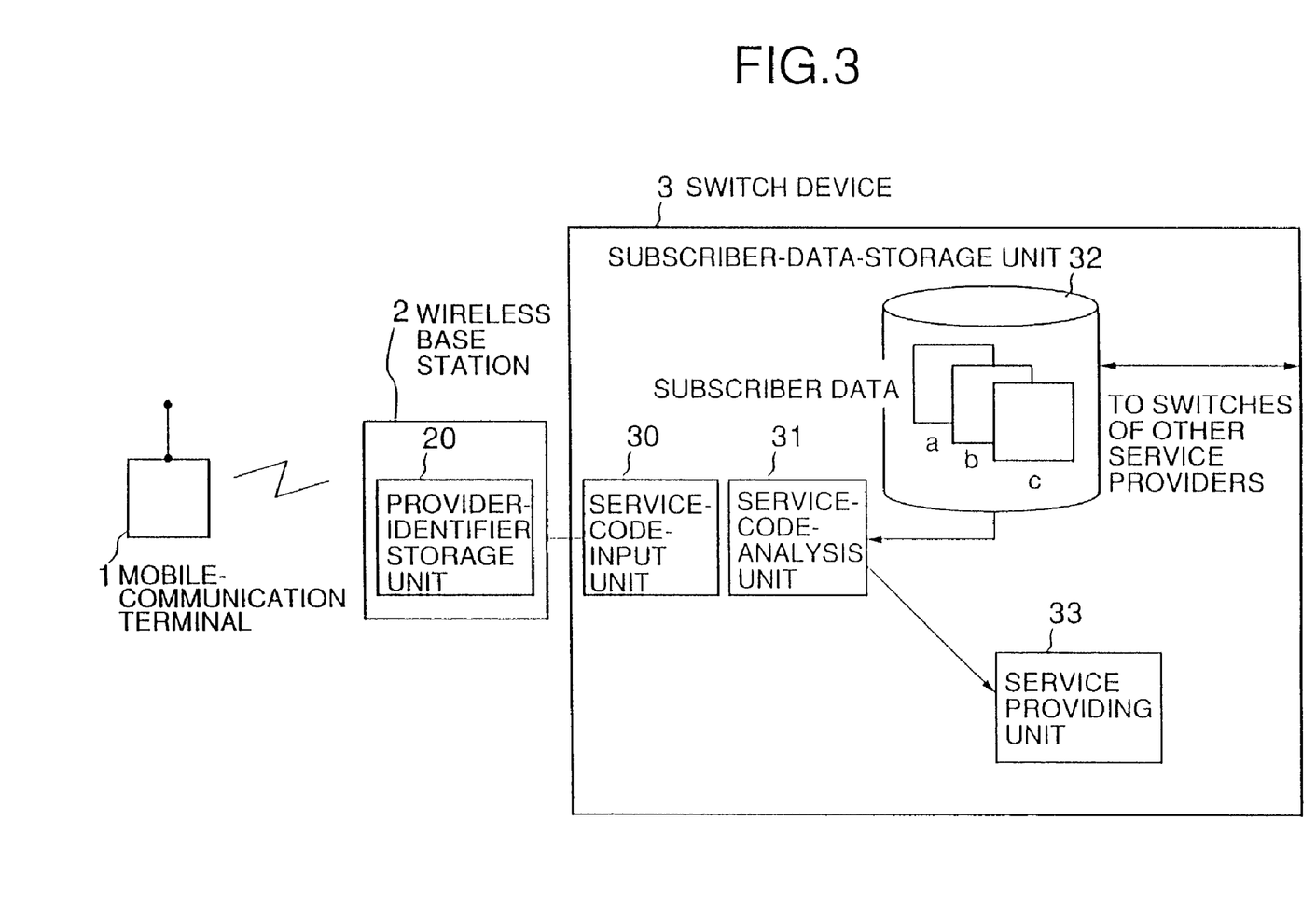
FIG. 3 is a block diagram of a configuration of a system according to a first embodiment of the present invention.
Figure 4:
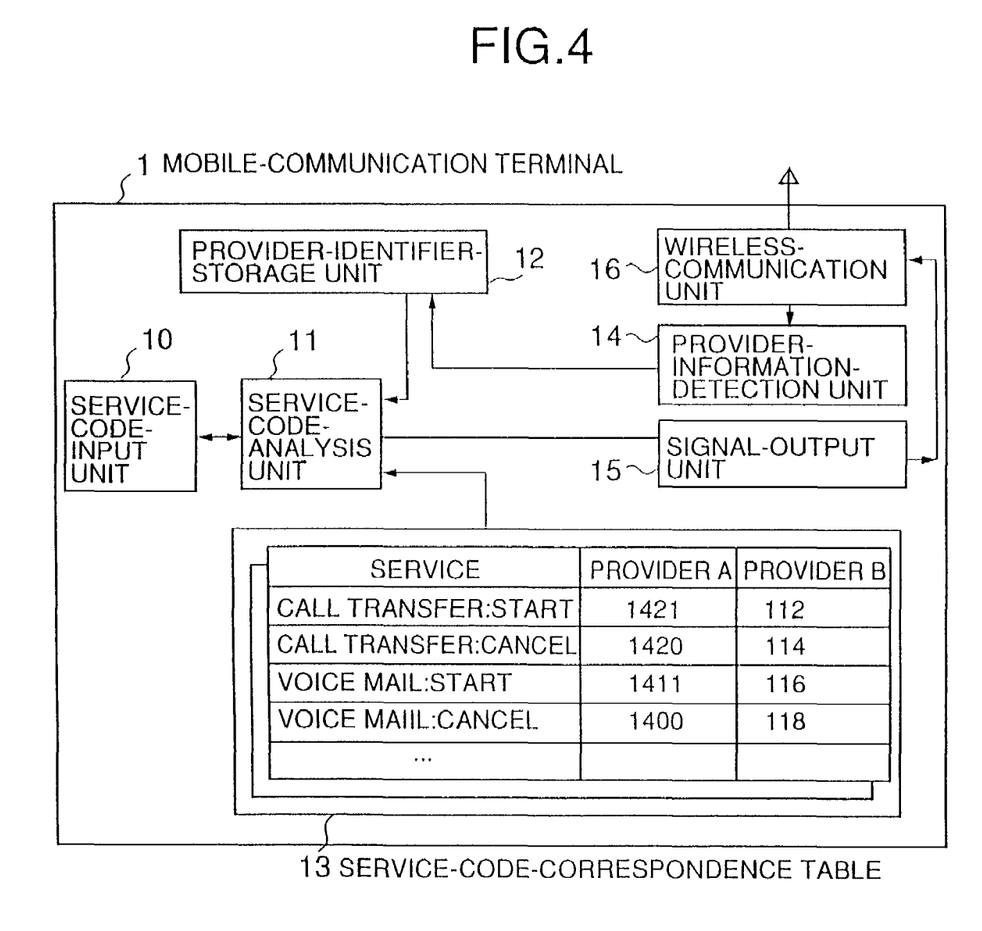
FIG. 4 is a block diagram of a mobile-communication terminal according to the first embodiment.

FIG. 3 is a block diagram of a configuration of a system according to a first embodiment of the present invention. FIG. 4 is a block diagram of a mobile-communication terminal according to the first embodiment. The first embodiment corresponds to the first principle described above.

The system of FIG. 3 includes the mobile-communication terminal 1, the wireless base station 2, and the switch device 3. The switch device 3 includes a service-code-input unit 30, a service-code-analysis unit 31, a subscriber-data-storage unit 32, and a service providing unit 33. The service-code-input unit 30 receives a service code from the wireless base station 2. The subscriber-data-storage unit 32 stores locations, registration data of registered services, etc., with respect to each subscriber.

The mobile-communication terminal 1 of FIG. 4 includes a service-code-input unit 10, a service-code-analysis unit 11, a provider-identifier-storage unit 12, a service-code-correspondence table 13, a provider-information-detection unit 14, a signal-output unit 15, and a wireless-communication unit 16. The service-code-analysis unit 11 analyzes an entered service code based on the service-code-correspondence table 13. The provider-identifier-storage unit 12 stores a provider identifier received from the wireless base station 2. The service-code-correspondence table 13 stores service codes of all the communication-service providers with respect to each type of service request. The provider-information-detection unit 14 detects a provider identifier sent from the wireless base station 2. The signal-output unit 15 transmits a service code to the wireless base station 2. The wireless-communication unit 16 is used for wireless communication.

In the first embodiment, the service-code-correspondence table 13 of the mobile-communication terminal 1 stores service codes of all communication-service providers (service provider A, service provider B, and so on) with respect to each type of a requested service such as use of a call-transfer service, cancellation of a call-transfer service, use of a voice-mail service, cancellation of a voice-mail service, etc. The service-code-correspondence table 13 is stored in the mobile-communication terminal 1 in advance, and can be updated or rewritten externally.

Figure 5:
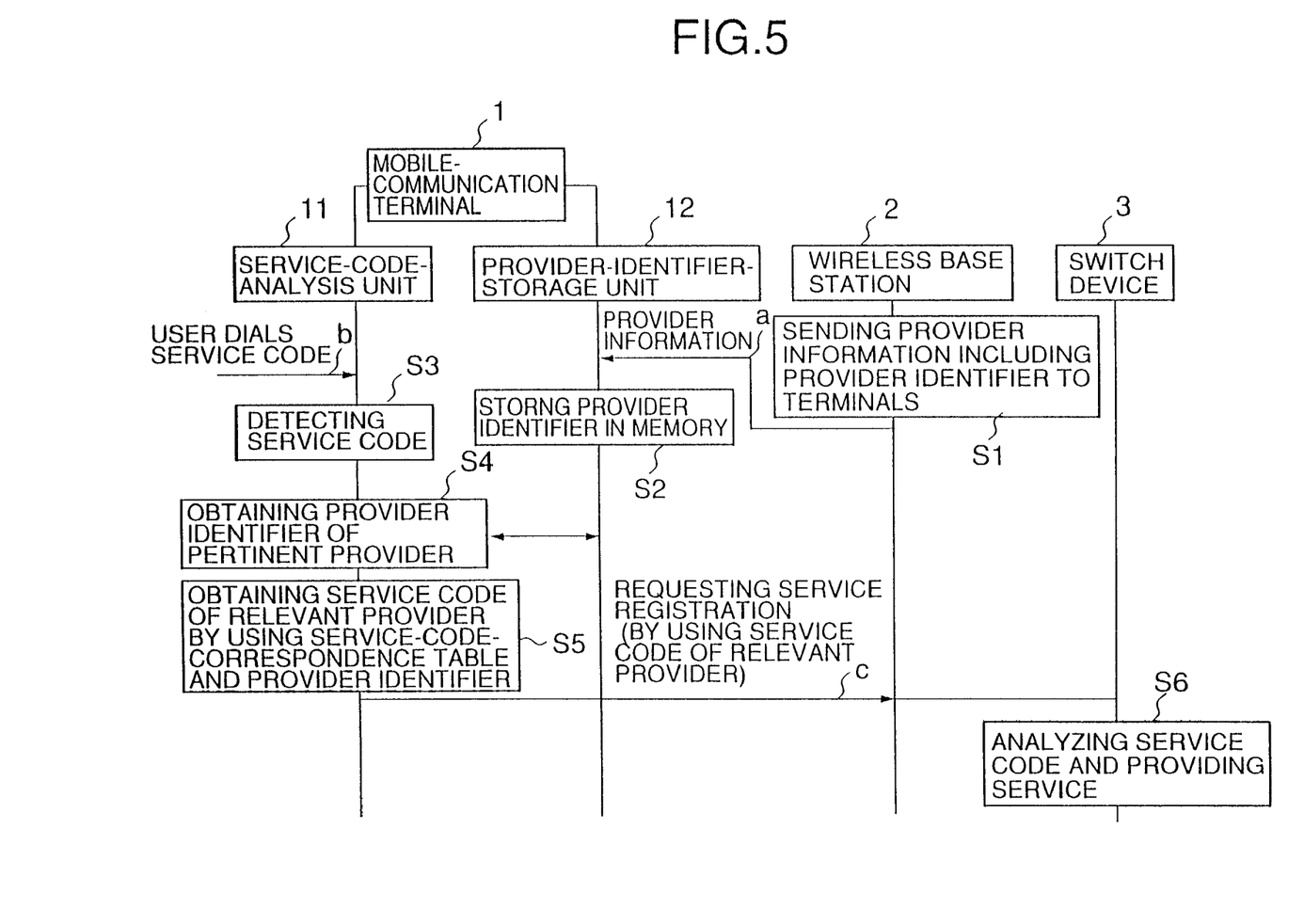
FIG. 5 is a sequence chart of operations performed according to the first embodiment.

FIG. 5 is a sequence chart of operations performed according to the first embodiment. FIG. 5 shows relations of operations between the service-code-analysis unit 11, the provider-identifier-storage unit 12, the wireless base station 2, and the switch device 3. Operations of other elements are omitted as being secondary to the above operations shown in the figure.

In what follows, the operation of the first embodiment will be described with reference to FIG. 3 through FIG. 5.

The wireless base station 2 stores in a memory thereof a provider identifier of a provider that owns the wireless base station 2. The provider identifier may be set by the switch device 3, or may be set internally in the wireless base station 2. The wireless base station 2 transmits provider information including the provider identifier to mobile-communication terminals residing in its area of control at constant intervals (step S1 of FIG. 5). The mobile-communication terminal 1 currently residing in this area receives the provider information via the wireless-communication unit 16. The provider-information-detection unit 14 detects the provider identifier, and stores it in the provider-identifier-storage unit 12 (step S2 of FIG. 5).

A user of the mobile-communication terminal 1 dials a service code via the service-code-input unit 10 in order to register a service corresponding to the dialed service code. This service code is one of the codes used by a communication-service provider with which the user is associated as a subscriber. In response, the service-code-analysis unit 11 of the mobile-communication terminal 1 is activated to detect the entered service code (step S3 of FIG. 5). The service-code-analysis unit 11 then obtains the provider identifier from the provider-identifier-storage unit 12 (step S4 of FIG. 5).

The service-code-analysis unit 11 obtains a corresponding service code equivalent to the detected service code by using the service-code-correspondence table 13 such that the corresponding service code is one that is used by the communication-service provider identified by the provider identifier (step S5 of FIG. 5). The corresponding service code is output from the signal-output unit 15 as a signal requesting a service registration, and is transmitted to the wireless base station 2 via the wireless-communication unit 16. This signal is forwarded from the wireless base station 2 to the switch device 3, where the service code is analyzed, and a requested service is provided (step S6 of FIG. 5).

In the switch device 3, when the service-code-input unit 30 receives the service code from the mobile-communication terminal 1, the service-code-analysis unit 31 can readily identify the service code since this code is the one used by no other than the communication-service provider to which the switch device 3 belongs. An identified result is stored in the subscriber-data-storage unit 32 as part of the data of the pertinent subscriber. If the mobile-communication terminal 1 is associated with a foreign communication-service provider, data of the requested service is transmitted to the foreign communication-service provider after the data is stored in the subscriber-data-storage unit 32. Alternatively, the data may not be stored in the subscriber-data-storage unit 32, and may be just sent to the foreign communication-service provider. The service providing unit 33 is activated by the service-code-analysis unit 31, and provides the requested service to a location of the subscriber as the location is registered in the subscriber-data-storage unit 32. When the data is registered in a switch of the foreign communication-service provider, this switch attends to necessary processing.

An example of a service-code conversion according to the first embodiment will be described below. The mobile-communication terminal 1 belongs to the communication-service provider B, and requests use of a voice-mail service via dialing of a number "116". The dialed number is detected by the service-code-analysis unit 11 of the mobile-communication terminal 1, and, then, the service-code-correspondence table 13 is referred to so as to identify use of a voice-mail service as a requested service. Since the provider-identifier-storage unit 12 has the provider identifier of the communication-service provider A stored therein, a service code of the communication-service provider A for the voice-mail service is looked for in the service-code-correspondence table 13. A service code "1411" is thus obtained. The service code "1411" is then sent from the signal-output unit 15 to the wireless base station 2 and the switch device 3.

Figure 6:
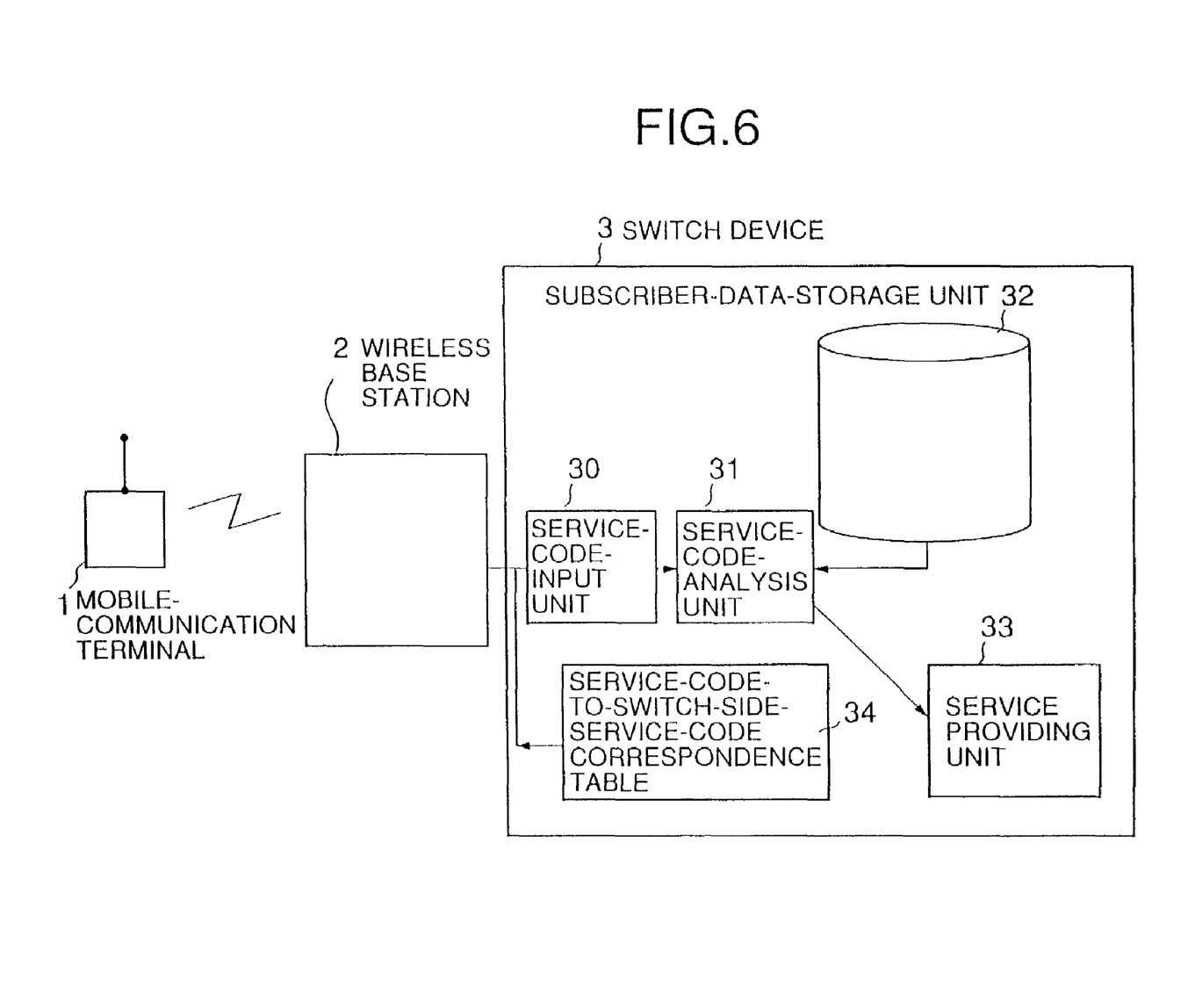
FIG. 6 is a block diagram of a configuration of a system according to a second embodiment of the present invention.
Figure 7:
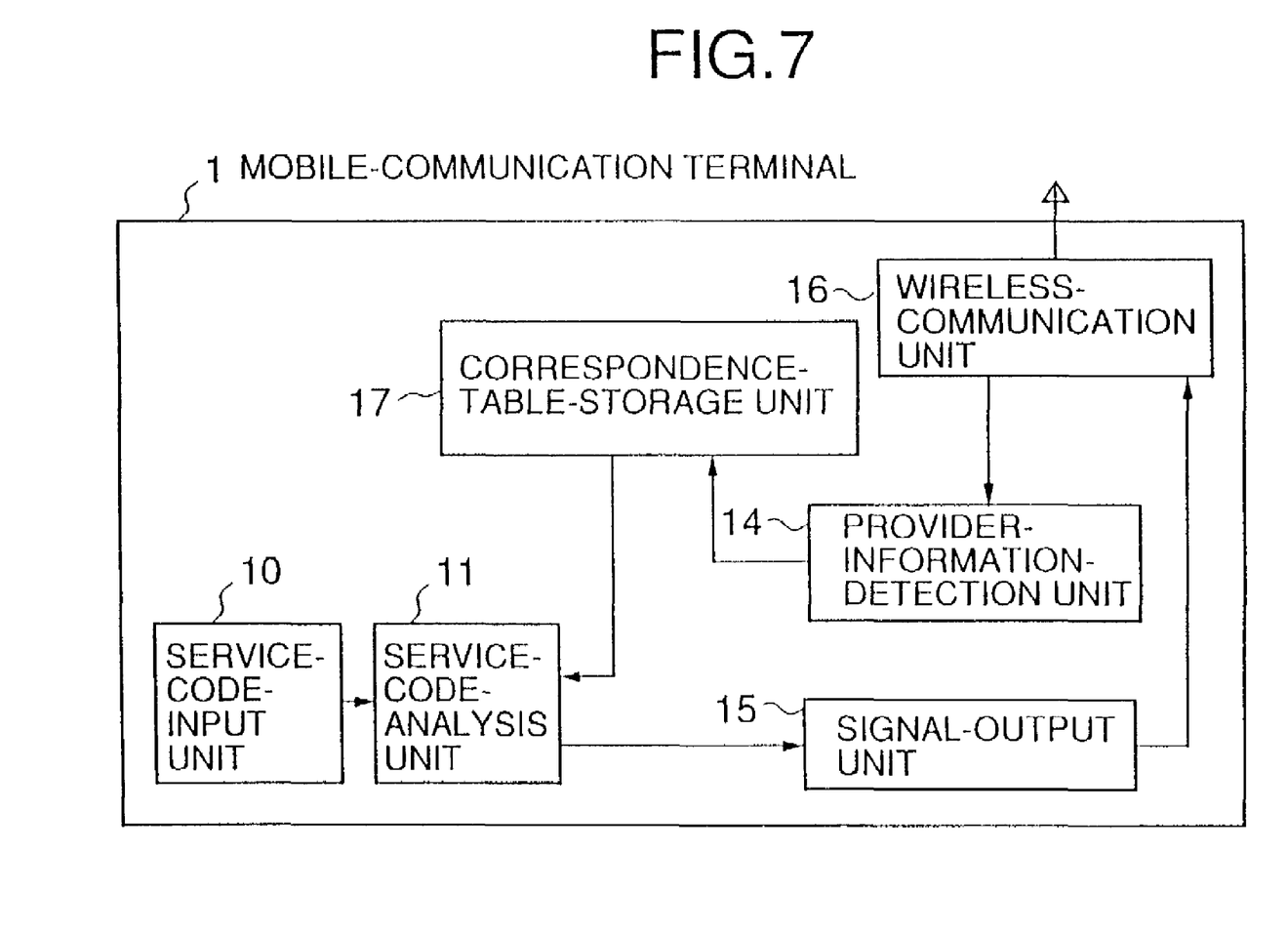
FIG. 7 is a block diagram of a mobile-communication terminal according to the second embodiment.

FIG. 6 is a block diagram of a configuration of a system according to a second embodiment of the present invention. FIG. 7 is a block diagram of a mobile-communication terminal according to the second embodiment. The second embodiment corresponds to the second principle described above.

In FIG. 6 and FIG. 7, the same elements as those of FIG. 3 and FIG. 4 are referred to by the same numerals, and a description thereof will be omitted. In FIG. 7, the mobile-communication terminal 1 includes a correspondence-table-storage unit 17 for storing a service-code-to-switch-side-service-code correspondence table. The switch device 3 of FIG. 6 includes a service-code-to-switch-side-service-code correspondence table 34.

The service-code-to-switch-side-service-code correspondence table 34 stores service codes that are used for requesting service, and are defined by each one of foreign communication-service providers. The service-code-to-switch-side-service-code correspondence table 34 further stores switch-side service codes that are defined by the communication-service provider to which the wireless base station 2 and the switch device 3 belong. The service-code-to-switch-side-service-code correspondence table 34 provides correspondences between the service codes and the switch-side service codes.

Figure 8:
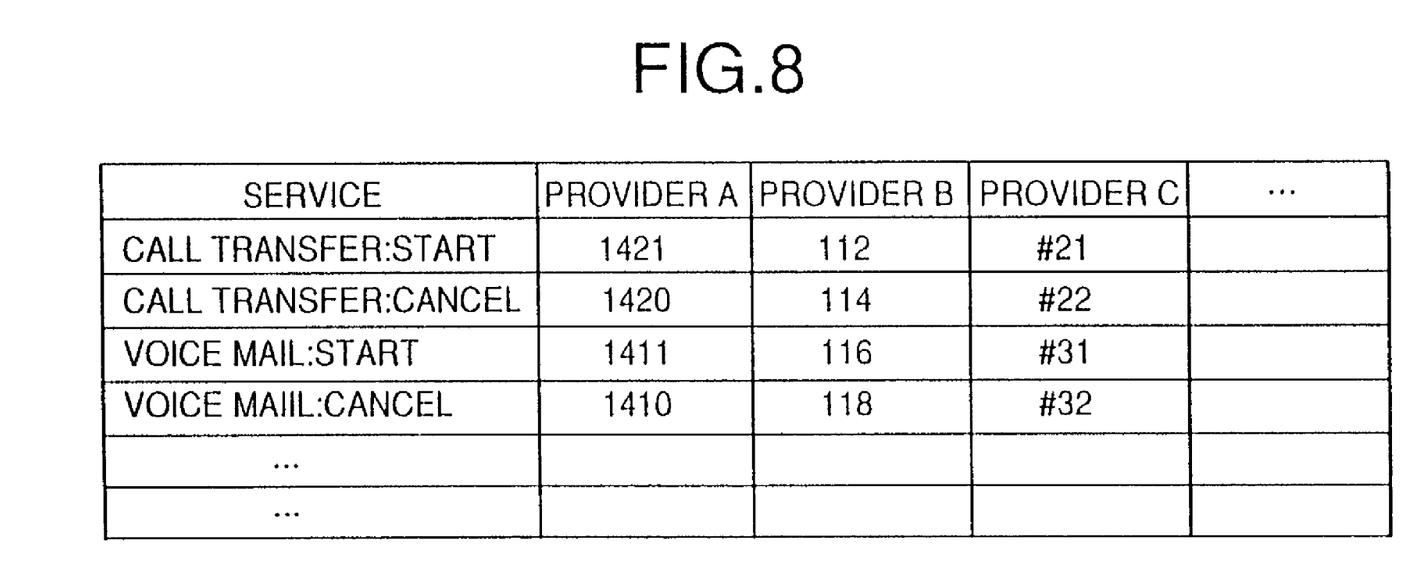
FIG. 8 is an illustrative drawing showing an example of the service-code-to-switch-side-service-code correspondence table.

FIG. 8 is an illustrative drawing showing an example of the service-code-to-switch-side-service-code correspondence table 34.

As shown in FIG. 34, the service-code-to-switch-side-service-code correspondence table 34 stores service codes of the foreign communication-service providers A and B with respect to each type of service such as use of a call-transfer service, cancellation of a call-transfer service, use of a voice-mail service, cancellation of a voice-mail service, etc. The last column of the table has entries of the switch-side service codes that are employed by the communication-service provider of the wireless base station 2 and the switch device 3.

Figure 9:
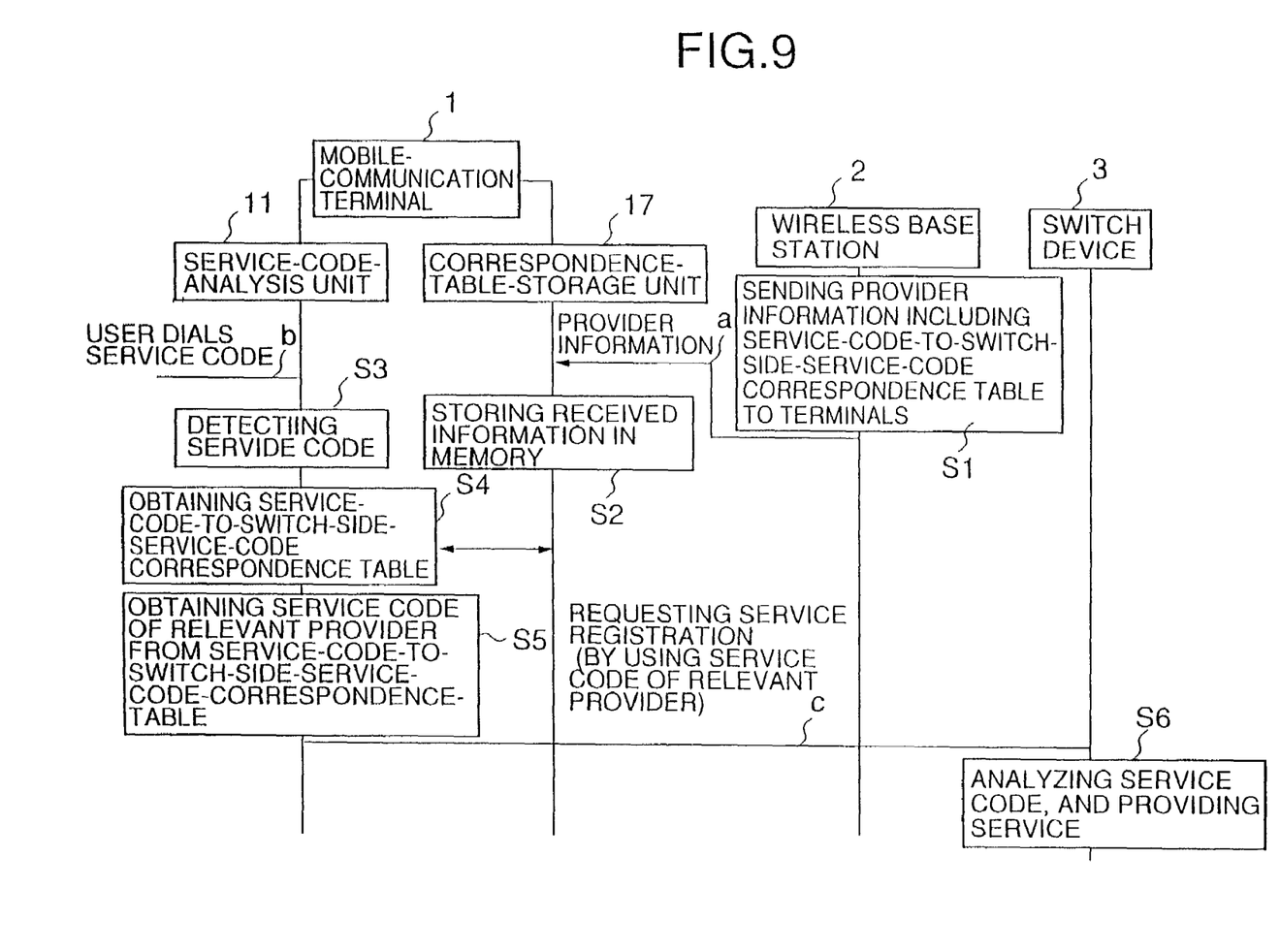
FIG. 9 is a sequence chart showing operations performed according to the second embodiment of the present invention.

FIG. 9 is a sequence chart showing operations performed according to the second embodiment of the present invention. FIG. 9 shows mutual operational relations between the service-code-analysis unit 11, the correspondence-table-storage unit 17, the wireless base station 2, and the switch device 3. Operations of other elements are omitted as being secondary to the operations shown in the figure.

In what follows, the operation of the second embodiment will be described with reference to FIG. 6 through FIG. 9.

The wireless base station 2 receives provider information including the service-code-to-switch-side-service-code correspondence table 34 from the switch device 3, and transmits the provider information to the mobile-communication terminal 1 (step S1 of FIG. 9). The mobile-communication terminal 1 currently residing in the area of the wireless base station 2 receives the provider information via the wireless-communication unit 16. The provider-information-detection unit 14 detects the provider information, and stores the service-code-to-switch-side-service-code correspondence table in the correspondence-table-storage unit 17 (step S2 of FIG. 9).

A user of the mobile-communication terminal 1 dials a service code via the service-code-input unit 10 in order to register a service corresponding to the dialed service code. This service code is one of the codes used by a communication-service provider with which the user is associated as a subscriber. In response, the service-code-analysis unit 11 of the mobile-communication terminal 1 is activated to detect the entered service code (step S3 of FIG. 9). The service-code-analysis unit 11 then obtains the contents of the correspondence-table-storage unit 17 (step S4 of FIG. 9).

The service-code-analysis unit 11 obtains a switch-side service code corresponding to the detected service code by using the service-code-to-switch-side-service-code correspondence table (step S5 of FIG. 9). The switch-side service code is output from the signal-output unit 15 as a signal requesting a service registration, and is transmitted to the wireless base station 2 via the wireless-communication unit 16. This signal is forwarded from the wireless base station 2 to the switch device 3, where the service code is analyzed, and a requested service is provided (step S6 of FIG. 9).

An example of a service-code conversion will be given below with reference to the service-code-to-switch-side-service-code correspondence table shown in FIG. 8.

When the mobile-communication terminal 1 belonging to the communication-service provider B requests use of a voice-mail service through dialing of a number "116", the service-code-analysis unit 11 of the mobile-communication terminal 1 detects the dialed number. Then, the service-code-to-switch-side-service-code correspondence table of FIG. 8 is referred to, and a switch-side service code "#31" is extracted as a code corresponding to the number "116". The extracted service code "#31" is then sent from the signal-output unit 15 to the wireless base station 2 and the switch device 3.

As described above, the present invention eliminates a need for a switch to have a whole series of service codes of all the communication-service providers that permit roaming, thereby avoiding a need for a huge database and a complex processing procedure. This reduces the load of code conversion on the switch, and makes it possible to perform high-speed call processing and to enhance reliability of the switch.

Further, the present invention is not limited to these embodiments, but various variations and modifications may be made without departing from the scope of the present invention.

The present application is based on Japanese priority application No. 10-290188 filed on Oct. 13, 1998, with the Japanese Patent Office, the entire contents of which are hereby incorporated by reference.

What is claimed is:

1. A method of registering a service whereby a mobile-communication terminal of a given communication-service provider roaming in a network of a foreign communication-service provider registers a service, said method comprising the steps of:

sending a provider identifier of the foreign communication-service provider from the network to the mobile-communication terminal;

storing the provider identifier in the mobile-communication terminal;

providing a service-code-correspondence table in the mobile-communication terminal, the table showing correspondences of service codes between a plurality of communication-service providers including the given communication-service provider and the foreign communication-service provider, the service codes being used by users to request registration of one or more of a plurality of services provided by each one of the plurality of communication-service providers, the correspondence table containing an entry of service codes corresponding to each of the services as a separate entry for each of the communication-service providers in such a manner that each of the service codes of one communication-service provider belongs to a corresponding one of the services, and is paired with a corresponding one of the service codes of another communication-service provider;

identifying a service code of the foreign communication-service provider corresponding to a service code of the given communication-service provider by referring to the table and the provider identifier in response to the service code of the given communication-service provider entered by a user in the mobile-communication terminal, the service code of the given communication-service provider indicating a user request for registration of a corresponding type of service; and sending the service code of the foreign communication-service provider from the mobile-communication terminal to the network.

2. The method as claimed in claim 1, wherein the step of sending a provider identifier of the foreign communication-service provider is performed at constant intervals.

3. The method as claimed in claim 1, further comprising the steps of;

receiving by a switch of the network the service code of the foreign communication-service provider sent from the mobile-communication terminal; and registering data of the received service code in subscriber data stored in the switch.

4. A method of registering a service whereby a mobile-communication terminal of a given communication-service provider roaming in a network of a foreign communication-service provider registers a service, said method comprising the steps of:

sending a correspondence table from the network to the mobile-communication terminal, the table showing correspondences between service codes of the foreign communication-service provider and service codes of a plurality of communication-service providers including the given communication-service provider, the service codes being used by users to request registration of one or more of a a plurality of services provided by each one of the plurality of communication-service providers, the correspondence table containing an entry of service codes corresponding to each of the services as a separate entry for each of the communication-service providers in such a manner that each of the service codes of one communication-service provider belongs to a corresponding one of the services, and is paired with a corresponding one of the service codes of another communication-service provider;

storing the correspondence table in the mobile-communication terminal;

identifying a service code of the foreign communication-service provider corresponding to a service code of the given communication-service provider by referring to the correspondence table in response to the service code of the given communication-service provider entered by a user in the mobile-communication terminal, the service code of the given communication-service provider indicating a user request for registration of a corresponding type of service; and sending the service code of the foreign communication-service provider from the mobile-communication terminal to the network.

5. The method as claimed in claim 4, further comprising the steps of:

receiving by a switch of the network the service code of the foreign communication-service provider sent from the mobile-communication terminal; and registering data of the received service code in subscriber data stored in the switch.

6. A method of registering a service whereby a mobile-communication terminal of a given communication-service provider roaming in a network of a foreign communication-service provider registers a service, said method comprising the steps of:

sending a service code of the given communication-service provider and a provider identifier directly indicating the given communication-service provider from the mobile-communication terminal to a switch of the network in response to the service code of the given communication-service provider entered by a user in the mobile-communication terminal, the service code of the given communication-service provider indicating a user request for registration of a corresponding type of service; and identifying a service code of the foreign communication-service provider corresponding to the service code of the given communication-service provider by referring to the provider identifier and a table which shows correspondences of service codes between a plurality of communication-service providers including the given communication-service provider and the foreign communication-service provider, the service codes being used by users to request registration of one or more of a plurality of services provided by each one of the plurality of communication-service providers, the table containing an entry of service codes corresponding to each of the plurality of services as a separate entry for each of the communication-service providers in such a manner that each of the service codes of one communication-service provider belongs to a corresponding one of the services, and is paired with a corresponding one of the service codes of another communication-service provider.

7. A method of registering a service whereby a mobile-communication terminal of a given communication-service provider roaming in a network of a foreign communication-service provider registers a service, said method comprising the steps of:

sending information from the network to the mobile-communication terminal, the information being configured in a correspondence table to enable the mobile-communication terminal to identify service codes used by the foreign communication-service provider, the service codes being used by users to request registration of one or more of a plurality of services provided by each of the communication-service providers, the correspondence table containing an entry of service codes corresponding to each of the services as a separate entry for each of the communication-service providers in such a manner that each of the service codes of one communication-service provider belongs to a corresponding one of the services, and is paired with a corresponding one of the service codes of another communication-service provider;

identifying a service code of the foreign communication-service provider corresponding to a service code of the given communication-service provider based on said information in response to the service code of the given communication-service provider entered by a user in the mobile-communication terminal, the service code of the given communication-service provider indicating a user request for registration of a corresponding type of service; and sending the service code of the foreign communication-service provider from the mobile-communication terminal to the network.

8. A system for mobile communication, comprising:

a base-station-and-switch device which belongs to a first communication-service provider, and includes a provider-identifier-notification unit which transmits a provider identifier of the first communication-service provider; and a mobile-communication terminal which belongs to a second communication-service provider, and includes:

a provider-identifier-storage unit which stores the provider identifier received from the base-station-and-switch device;

a service-code-correspondence-table storage unit which stores a service-code-correspondence table showing correspondences of service codes between a plurality of communication-service providers including the first and second communication-service providers, the service codes being used by users to request registration of one or more of a plurality of services provided by each one of the plurality of communication-service providers, the service-code-correspondence table containing an entry of service codes corresponding to each of the services as a separate entry for each of the communication-service providers in such a manner that each of the service codes of one communication-service provider belongs to a corresponding one of the services, and is paired with a corresponding one of the service codes of another communication-service provider;

a service-code-analysis unit which identifies a service code of the first communication-service provider corresponding to a service code of the second communication-service provider by referring to the service-code-correspondence table and the provider identifier when in response to the service code of the given communication-service provider is entered by a user in the mobile-communication terminal, the service code of the given communication-service provider indicating a user request for registration of a corresponding type of service; and a signal-output unit which transmits the service code of the first communication-service provider to the base-station-and-switch device.

9. A system for mobile communication, comprising:

a base-station-and-switch device which belongs to a first communication-service provider, and includes a service-code-correspondence-table notifying unit which transmits a service-code-correspondence table, the service-code-correspondence table showing correspondences between service codes of the first communication-service provider and service codes of other communication-service providers, the service codes being used by users to request registration of one or more of a plurality of services provided by each one of the communication-service providers, the table containing an entry of service codes corresponding to each of the services as a separate entry for each of the communication-service providers in such a manner that each of the service codes of one communication-service provider belongs to a corresponding one of the services, and is paired with a corresponding one of the service codes of another communication-service provider; and a mobile-communication terminal which belongs to a second communication-service provider that is one of said other communication service providers, and includes:

a correspondence-table-storage unit which stores the service-code-correspondence table sent from the base-station-and-switch device;

a service-code-analysis unit which identifies a service code of the first communication-service provider corresponding to a service code of the second communication-service provider by referring to the service-code-correspondence table stored in the correspondence-table-storage unit in response to the service code of the second communication-service provider entered by a user in the mobile-communication terminal, the service code of the given communication-service provider indicating a user request for registration of a corresponding type of service; and a signal-output unit which transmits the service code of the first communication-service provider to the base-station-and-switch device.

* * * * *